(No Model.)
A. VANDERBEEK
PHOTOGRAPHIC CAMERA.
No. 494,400. Patented Mar. 28, 1893.
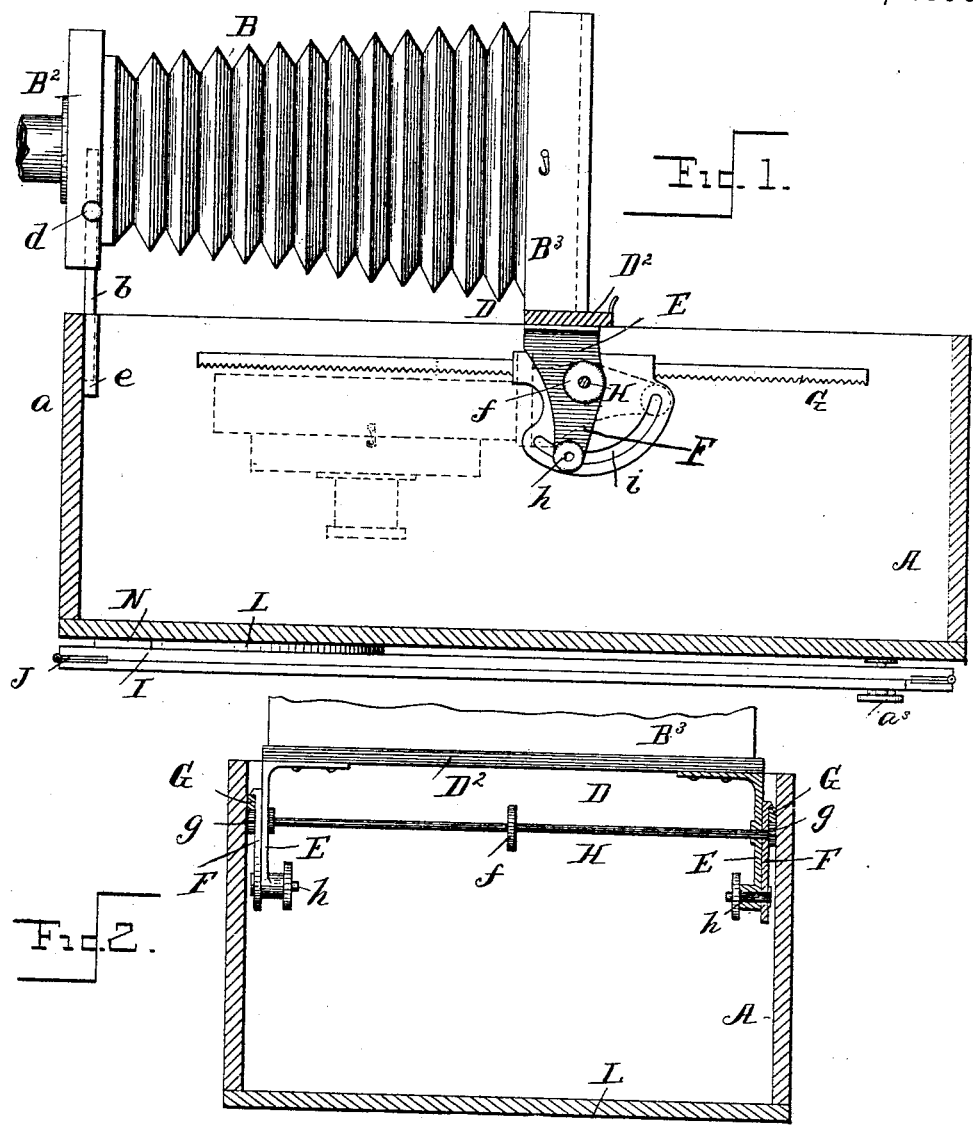
Witnesses
W. H. Courtland
J. J. Killham
Inventor
Abraham Vanderbeek
by T. F. Bourne
his atty.

UNITED STATES PATENT OFFICE.

ABRAHAM VANDERBEEK, OF HARTFORD, CONNECTICUT.

PHOTOGRAPHIC CAMERA.

SPECIFICATION forming part of Letters Patent No. 494,400, dated March 28, 1893.

Application filed November 24, 1891. Serial No. 412,967. (No model.)

*To all whom it may concern:*

Be it known that I, ABRAHAM VANDERBEEK, a citizen of the United States, and a resident of Hartford, in the county of Hartford and State of Connecticut, have invented certain new and useful Improvements in Photographic Cameras, of which the following is a specification.

The object of my invention is to facilitate the carrying or transportation, and adjustment of the usual photographic apparatus, by adjustably supporting a camera within or to a carrier box or receptacle in such manner that it can be readily placed in focusing position without removing or detaching it from the box or receptacle and easily or quickly extended for focusing, and wherein it can be snugly packed in the carrier box or receptacle without trouble, the box or receptacle thereby becoming the supporting means for the camera as well as its carrying or storing receptacle.

The invention consists in the novel details of improvement and the combination of parts that will be more fully hereinafter set forth and then pointed out in the claims.

Reference is to be had to the accompanying drawings forming part hereof, wherein, Figure 1, is a partly sectional side elevation of my improvements. Fig. 2 is a vertical cross section of the same.

In the drawings the letter A, indicates a suitable carrier box or receptacle adapted to receive a camera B, and if desired to also hold plates. The camera B, is adjustably carried within the box or receptacle A, so that it can be raised above the box or receptacle into position for focusing as shown in Fig. 1. For this purpose the camera is pivotally carried within the box or receptacle in such manner that when the camera bellows is folded it can be swung down within the box or receptacle as in dotted lines Fig. 1, or elevated above the box or receptacle as shown. And to permit extension of the camera for focusing I preferably adjustably connect its forward or lens holding part $B^2$ to the forward side $a$ of the box or receptacle A, and attach its rear part $B^3$, to a movable support D, that is adapted to travel longitudinally of the box or receptacle. The part $B^2$ of the camera may be connected to the side of the box or receptacle, as desired, but I prefer to use a vertical bar $b$, that works in a suitable socket on the part $B^2$ of the camera and is secured to the latter in any position by a thumb screw or the like $d$, whereby the forward part $B^2$ of the camera can be adjusted vertically to raise or lower the lens. The lower end of the bar $b$, fits in a socket or the like $e$, or the box or receptacle A as shown, whereby the forward part of the camera is connected to the box or receptacle.

The support D for the back part $B^3$ of the camera may consist of a cross bar $D^2$, that is supported on brackets or the like E, that are shown pivoted on sliding frames F. The frames F, are shown supported to slide on rack bars G, extending longitudinally along the inner opposite walls of the box or receptacle A, as in Fig. 2. The pivots for the brackets F, preferably consist of a shaft H, that extends across the box or receptacle A, and is journaled at its ends in the frames F, while passing through the brackets E as shown, whereby the latter can turn on the shaft H. The shaft H, preferably carries a milled wheel $f$, by which it can be rotated. On the ends of the shaft H, are pinions $g$, that mesh with the rack G, whereby when the shaft H, is turned said pinions by working in said rack will cause the frames F, to slide along the rack G, whereby the camera support D, will be moved longitudinally of the box or receptacle A. With this arrangement it is only necessary to turn the wheel $f$, when the support D and its attached camera will be moved along the box or receptacle for focusing purposes.

To hold the support D, and thereby the camera, in the desired position I preferably attach to the brackets E, thumb screws or the like $h$, that work in slots $i$, in the frames F, said slots lying in the arc of a circle described around the shaft H, as shown. By this means the support D can be held in any position it may be desired to place it.

My improvements operate as follows: To place the camera within the box or receptacle A for storage it is first closed together as usual (supposing it to be attached in any suitable manner to the support D). The thumbscrews $h$ are then loosened, and the support D swung down carrying down the camera as in dotted lines Fig. 1, when by tightening the thumb screws $h$ it will be firmly held in position. To adjust the camera into focusing position the support D is first swung up to raise the camera above the box or receptacle A, and the thumb screws $h$ then tightened. The forward part $B^2$, of the camera is then adjusted into position on the side of the box or receptacle A. By then turning the shaft H, the back part $B^3$ of the camera can be moved for focusing. A suitable cover (not shown) will be provided for the box or receptacle A.

From the foregoing it will be seen that it is not necessary to lift the camera from its box or receptacle, adjust it upon a base and adjust the base upon a tripod, as the camera remains attached to the box or receptacle at all times. By this means much time is saved and trouble is overcome, and fewer parts have to be carried around.

The whole device is compact, simple and easy to operate.

It will be understood that this box or receptacle can be placed upon any suitable stand or tripod.

Having now described my invention, what I claim is—

1. The combination of the box or receptacle A, guide rack G carried thereby, frame F, on said rack a bracket pivoted on said frame, a gear for moving said frame on said rack, and a thumb screw and slotted part for holding said bracket on the frame, substantially as described.

2. The combination of the box or receptacle A, rack G, frame F, having slot $i$, bracket E pivoted thereto, thumb screw $h$, carried by said bracket and entering said slot, whereby the frame can be swung down and up and held in position, substantially as described.

3. The combination of the box or receptacle A, rack G, frames F, shaft H, connecting said frames, gear on said shaft, brackets E, pivoted on said shaft a cross bar connecting said brackets and means to connect said frame and bracket to hold the latter in position, substantially as described.

Signed at New York, in the county of New York and State of New York, this 21st day of November, A. D. 1891.

ABRAHAM VANDERBEEK.

Witnesses:
   C. L. WALKER,
   T. F. BOURNE.